United States Patent
Solaro et al.

(10) Patent No.: US 7,389,289 B2
(45) Date of Patent: Jun. 17, 2008

(54) FILTERING SEARCH RESULTS BY GRADE LEVEL READABILITY

(75) Inventors: John A. Solaro, Bellevue, WA (US); Keith D. Senzel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 259 days.

(21) Appl. No.: 11/254,961

(22) Filed: Oct. 20, 2005

(65) Prior Publication Data

US 2007/0094293 A1    Apr. 26, 2007

(51) Int. Cl.
  *G06F 7/00* (2006.01)
  *G06F 17/30* (2006.01)
(52) U.S. Cl. .................................. 707/5; 707/3; 715/273
(58) Field of Classification Search ................. 707/102, 707/2, 3, 4, 5
See application file for complete search history.

(56) References Cited

U.S. PATENT DOCUMENTS 5,974,409 A  * 10/1999 Sanu et al. ..................... 707/3
6,665,659 B1 * 12/2003 Logan ........................... 707/3

\* cited by examiner

*Primary Examiner*—James K. Trujillo
*Assistant Examiner*—Jeffrey Chang
(74) *Attorney, Agent, or Firm*—Workman Nydegger (57) ABSTRACT

When a search index is generated, it includes entries tagged with the readability of documents referenced by the search index. A determination of the readability is made if a document is not yet associated with a preexisting entry in the search index and is being added, by analyzing the document to produce a readability indicator. For example, the readability indicator can correspond to a grade level identifier, thereby enabling search index to be searchable by grade level, age, or age range. A grade level-based search request received from a user can be submitted to search this search index for documents limited to a specific grade or age readability. The search results that are returned are thus filtered in regard to the readability indicator associated with the documents in the search index.

5 Claims, 5 Drawing Sheets

FILTERING SEARCH RESULTS BY GRADE LEVEL READABILITY

BACKGROUND

In recent years, search engines have become a ubiquitous and indispensable tool for millions of people. Typically, a search provider generates a searchable index of documents for use by the search engine. Different search providers utilize different technologies to develop their search indexes, and therefore, search results can vary widely between search providers. Generally, a user of a search engine enters a word or string of words or a phrase as a basis of a search for documents within the search index provided by the search provider. Some search engines provide a score of the relevance of the search result based on an applied filter generated from the search term or terms. In order to provide advanced functionality, some search engines allow a user to use other criteria to further narrow the search results. For example, a user can choose to restrict search results to a specific language, or to documents from certain domains, and documents of certain types (e.g., images).

For many applications, a conventional search system of the type described above is acceptable. However, results of such searches can be inappropriate for particular age groups. For example, a young child searching the Internet for information for an assignment on a grade school subject will usually not find a Doctoral dissertation returned by the search to be very useful, because the child's vocabulary and understanding of material of that complexity is too limited. Presently, limiting search results that are provided to those appropriate for the age or knowledge of the searcher is sometimes attempted using a run time solution that filters results based on an analysis of documents; however, the filtering is performed contemporaneous with the processing of the search, and this solution is quite slow and often unreliable.

Recently, searching tools originally developed for identifying web pages over the Internet have also found application in other areas of data management, such as document management on desktop computers. With each successive machine generation, the personal computer, as used both in the home and in the workplace, is being required to manage increasingly greater amounts of information. Therefore, tools for organizing, cataloging, and locating particular files and information are of particular interest. Accordingly, advances in search technology that have efficient search capabilities, yet can return results based upon document readability appropriate to the searcher, are of particular interest for educational, business, and home use.

SUMMARY

As explained in greater detail below, various computer implemented techniques are described for generating a search index. In particular, a technique described in more detail below involves generating a search index that is searchable by grade level identifiers that are included in each entry of the search index. One such technique, which is described below, includes first identifying a document for inclusion in the search index. Next, a determination is made whether the document identified is associated with a preexisting entry in the search index that relates to readability. In this example, when the document that was identified is not associated with such a preexisting entry in the search index, the readability of the identified document is analyzed to produce a grade level identifier that is based on predetermined readability score criteria. Finally, a new entry is generated in the search index for the document. In this example, the new entry includes the grade level identifier corresponding to the readability of the document, thereby enabling the new entry to be searchable within the search index by grade level.

Another aspect is directed to a method for enabling a search query based on grade level. As discussed in detail below, this method includes first receiving a search request for a document search from a user device. Next as described below, it is determined whether the search request includes a grade level indicator for restricting a search result to be readable by a person of a specific age (or age range). When the search request includes the grade level indicator, the search request is submitted to a search index. In this example, the search index includes a plurality of document entries that can each incorporate a grade level indicator corresponding to a pre-evaluated readability score.

Yet another aspect discussed in more detail below is directed to a system for producing a search index that includes entries that are searchable by predetermined grade level identifiers associated with the entries. The system includes a search index database in which are stored a plurality of search index records, and a server computer in communication with the database. As described below, the server computer includes a processor, and a memory in communication with the processor. The memory stores data and machine instructions that can cause the processor to carry out a plurality of functions, such as selecting a document for addition to the search index database.

Other functions can include determining if the selected document has a related preexisting record in the search index database and if not, evaluating the readability of the identified document. A grade level identifier can be produced as a result of the readability evaluation, based on predetermined readability score criteria. Yet another function can include generating a new document record in the search index database for the selected document. This new document record can include the grade level identifier, thus enabling the new record to be identified during a search, in regard to its grade level identifier.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figures and Disclosed Embodiments are Not Limiting

Exemplary embodiments are illustrated in referenced Figures of the drawings. It is intended that the embodiments and Figures disclosed herein are to be considered illustrative rather than restrictive. Furthermore, in the claims that follow, when a list of alternatives uses the conjunctive "and" following the phrase "at least one of" or following the phrase "one of," the intended meaning of "and" corresponds to the conjunctive "or."

Exemplary Computing System

Figure 1:
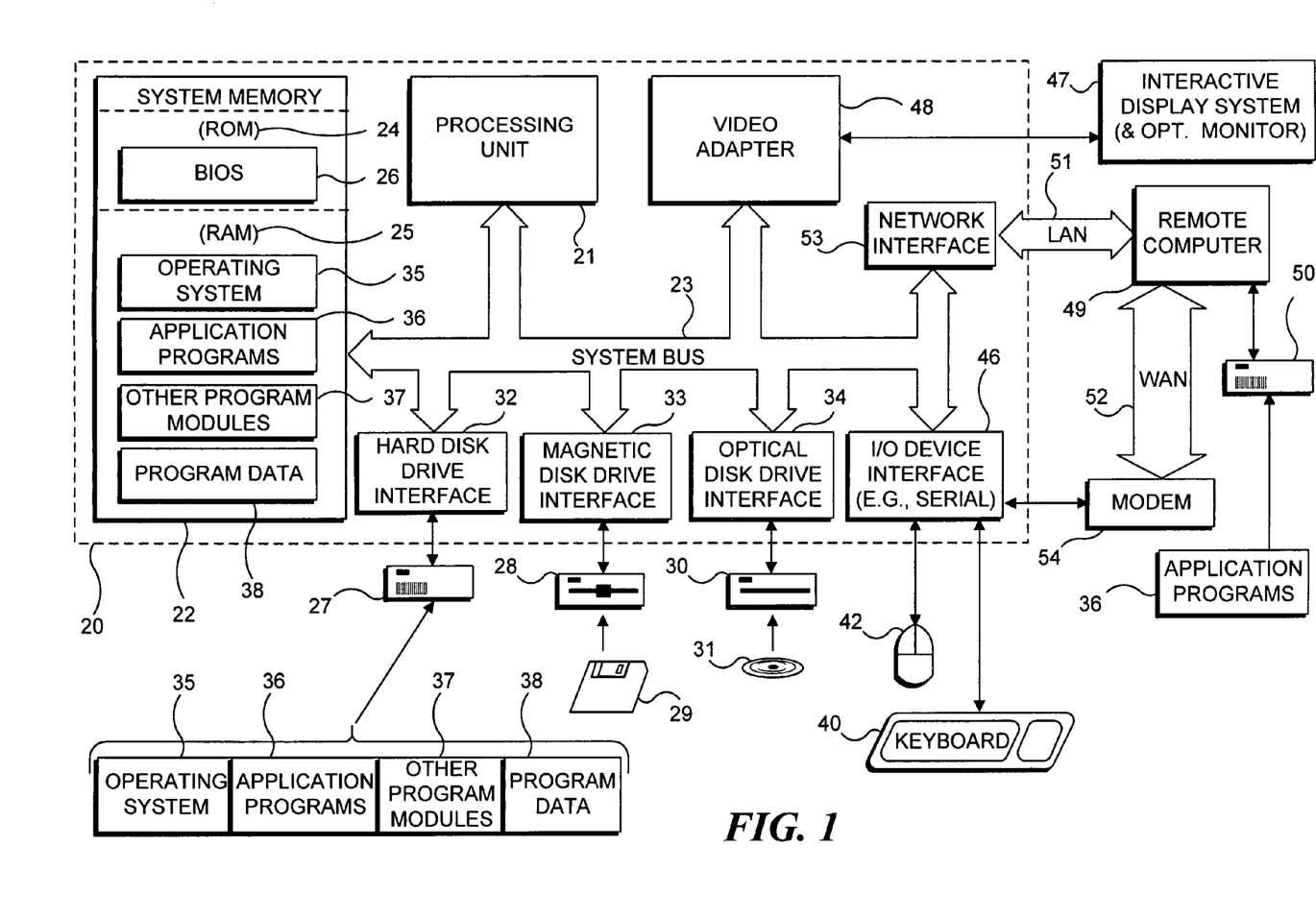
FIG. 1 is a functional block diagram of a generally conventional computing device that is suitable of implementing one or more grade level tagging and/or searching functions.

FIG. 1 is a functional block diagram of an exemplary computing device and/or computer server for enabling various aspects of grade level-based search functions initiated on computing devices, such as over a network, the Internet, or even on a single computing device.

The following discussion is intended to provide a brief, general description of a suitable computing environment in which certain methods discussed below may be implemented. Further, the following discussion illustrates a context for implementing computer-executable instructions, such as program modules, with a computing system. Generally, program modules include routines, programs, objects, components, data structures, etc., that perform particular tasks or implement particular abstract data types. The skilled practitioner will recognize that other computing system configurations may be applied, including multiprocessor systems, mainframe computers, personal computers, processor-controlled consumer electronics, personal digital assistants (PDAs) (but likely not when a server functionality is required), and the like. One implementation includes distributed computing environments where tasks are performed by remote processing devices that are linked through a communications network. In a distributed computing environment, program modules may be located in both local and remote memory storage devices.

With reference to FIG. 1, an exemplary system suitable for implementing various methods is depicted. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25.

A basic input/output system 26 (BIOS), which contains the fundamental routines that enable transfer of information between elements within the PC 20, such as during system start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the described exemplary environment employs a hard disk 27, removable magnetic disk 29, and removable optical disk 31, those skilled in the art will recognize that other types of computer readable media, which can store data and machine instructions that are accessible by a computer, such as magnetic cassettes, flash memory cards, digital video disks (DVDs), Bernoulli cartridges, RAMs, ROMs, and the like, may also be used.

A number of program modules and/or data may be stored on hard disk 27, magnetic disk 29, optical disk 31, ROM 24, or RAM 25, including an operating system 35, one or more application programs 36, other program modules 37, and program or other data 38. A user may enter commands and information in PC 20 and provide control input through input devices, such as a keyboard 40 and a pointing device 42. Pointing device 42 may include a mouse, stylus, wireless remote control, or other user interactive pointer. As used in the following description, the term "mouse" is intended to encompass any pointing device that is useful for controlling the position of a cursor on the screen. Other input devices (not shown) may include a microphone, joystick, haptic joystick, yoke, foot pedals, game pad, satellite dish, scanner, or the like. Also, PC 20 may include a Bluetooth radio or other wireless interface for communication with other interface devices, such as printers, or a network. These and other input/output (I/O) devices can be connected to processing unit 21 through an I/O interface 46 that is coupled to system bus 23. The phrase "I/O interface" is intended to encompass each interface specifically used for a serial port, a parallel port, a game port, a keyboard port, and/or a universal serial bus (USB). Optionally, a monitor 47 can be connected to system bus 23 via an appropriate interface, such as a video adapter 48. In general, PCs can also be coupled to other peripheral output devices (not shown), such as speakers (through a sound card or other audio interface—not shown) and printers.

Certain methods described in detail below, can be practiced on a single machine, although PC 20 can also operate in a networked environment using logical connections to one or more remote computers, such as a remote computer 49. Remote computer 49 can be another PC, a server (which can be configured much like PC 20), a router, a network PC, a peer device, or a satellite or other common network node, (none of which are shown), and a remote computer will typically include many or all of the elements described above in connection with PC 20, although only an external memory storage device 50 for the remote computing device has been illustrated in FIG. 1. The logical connections depicted in FIG. 1 include a local area network (LAN) 51 and a wide area network (WAN) 52. Such networking environments are common in offices, enterprise-wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Operating Environment

Figure 2:
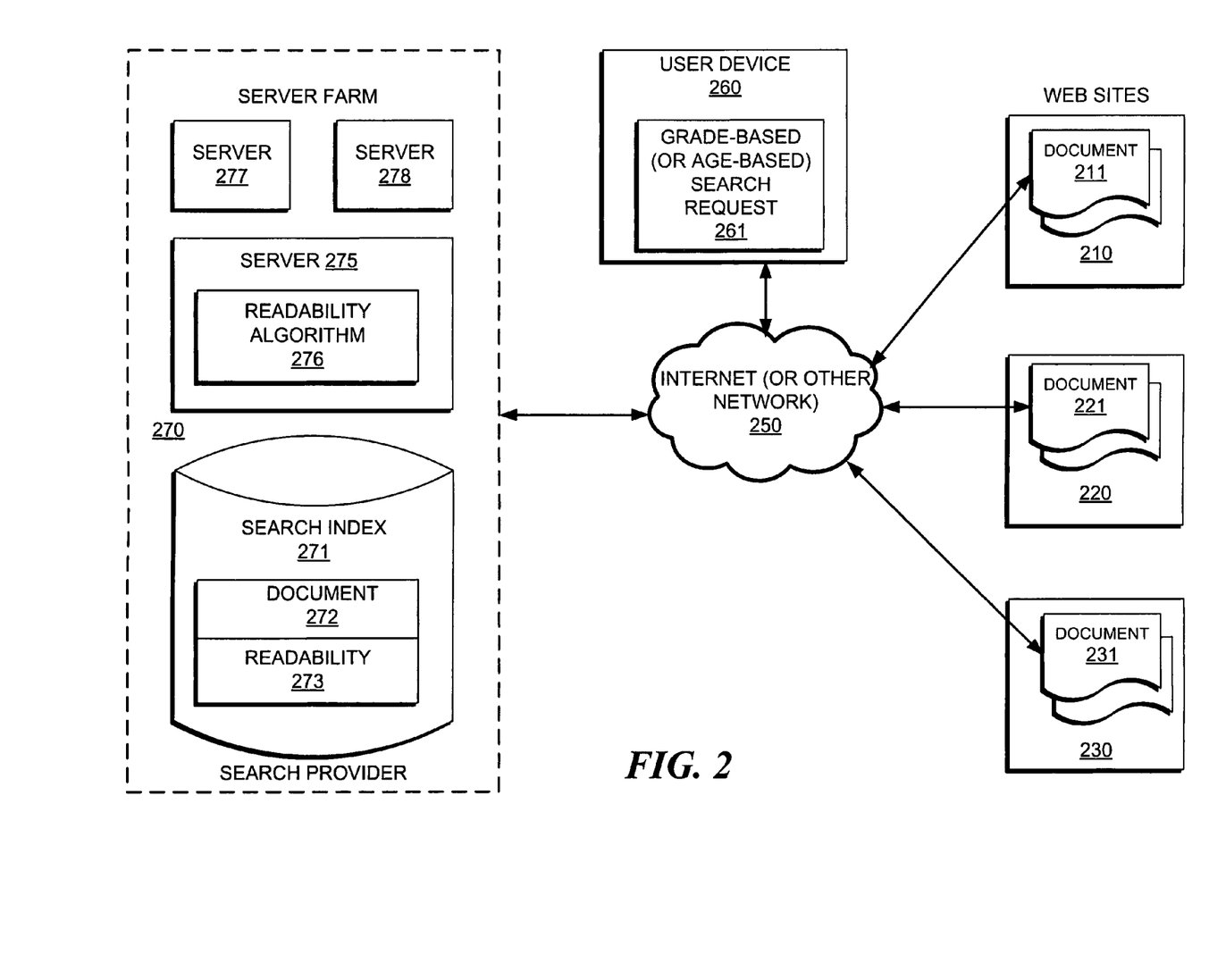
FIG. 2 is a functional block diagram of a server farm for implementing web crawling used to produce a search index, and for implementing other functions related to the search index.

FIG. 2 is a block diagram of an exemplary operating environment 200 for implementing various methods of generating a search index of documents having grade level identifiers and processing grade level based search requests to the search index. As used herein and in the claims that follow, the term "documents" is intended to broadly apply to any entity that might be referenced and returned in a search result, however, the terms is intended to particularly refer to text entities, since such entities will typically be read by a user when returned as references in the results of a search requested by the user. FIG. 2 shows a search provider 270 and such a search provide is likely to be implemented as a "server farm" that includes exemplary servers 275, 277 and 278 that are used to provide an indexing and search function. It will be understood that many more or fewer servers may be included at the search provider facilities and the servers may be disposed at different sites.

Server 275 is illustrated as being capable of executing a readability algorithm 276 used to determine the readability of a document that is being added to a search index 271. Search provider 270 has storage for search index 271, which is shown as including a document 272 that has been found to have a corresponding readability 273. Server farm 270 is shown as communicating over the Internet (or another network) 250, with a user device 260 and with three web sites 210, 220, and 230.

As shown in FIG. 2, user device 260 has initiated an age-based search request 261, which is communicated to search provider 270, thereby requesting a result derived from search index 271, but limited to document(s) having a readability corresponding to the age (or age range) stipulated in the age-based search request. Web site 210 is shown including an exemplary Web document 211. Likewise, web sites 220 and 230 each include exemplary Web documents 221 and 231, respectively, and may be part of a single shared domain, or in separate sub domains, or in a combination of linked domains on one or more servers and may be in one or more locations. In one implementation (not shown), a plurality of documents analogous to documents 211, 221, and 231 can be searchable documents stored on a single personal computer, which can be searched by a desktop search utility running on the personal computer. The personal computer may be user device 260, so that the age-based search request will be searching for one or more documents included in the search index of user device 260.

In the example illustrated in FIG. 2, search provider 270 can be any combination of computing devices, databases, and communication infrastructure suitable for operating a back-end operation to provide search engine functionality. Search providers and their attendant structures are well known in the art and, as such, the following discussion will be limited to only those conceptual elements that are actually necessary for conveying an enabling disclosure of the exemplary system and method disclosed herein.

Servers 275, 277, and 278 of search provider 270 can be any computing devices designed for operation in a highly networked parallel computing environment, as is known in the art. In one example, each of servers 275, 277, and 278 is, for example, a computer device like PC 20 of FIG. 1. Similarly, user device 260 can be any computing device suitable for creating and communicating an age-based (or other readability limited) search request and receiving and displaying the search result.

Readability algorithm 276 can be any algorithm suitable for evaluating the readability of a document. Examples of readability algorithms include the Flesch-Kincaid formula; the Kincaid formula; the Automated Readability index formula; the Coleman-Liau formula; the Flesh reading easy formula; the Fog Index; the Lix formula; and the SMOG-Grading formula. Each of the foregoing readability algorithms and other such algorithms will be known to the skilled practitioner and therefore, do not require and in-depth explanation to enable the present approach. However, by way of illustration, the Flesch Kincaid reading ease score test is based upon the formula:

$$206.835 - 1.015\left(\frac{\text{total words}}{\text{total sentences}}\right) - 84.6\left(\frac{\text{total syllables}}{\text{total words}}\right) \quad (1)$$

Internet (or other network) 250 communicates signals between user device 260 and web sites, 210, 220 and 230 in response to the result to the age-based search request that was returned by search provider 270. In one implementation, Internet (or other network) 250 can be configured to enable an agent application (e.g., a crawling program) running on any of servers 277, 278, and 275 to identify and retrieve documents, such as hypertext markup language (HTML), extensible markup language (XML), and extensible hypertext markup language (XHTML) Web documents that are accessible over the Internet (or other network). In another application, Internet (or other network) 250 can convey calls to dedicated application program interfaces (APIs) for readability analysis of documents as they are added to search index 271.

Figure 3:
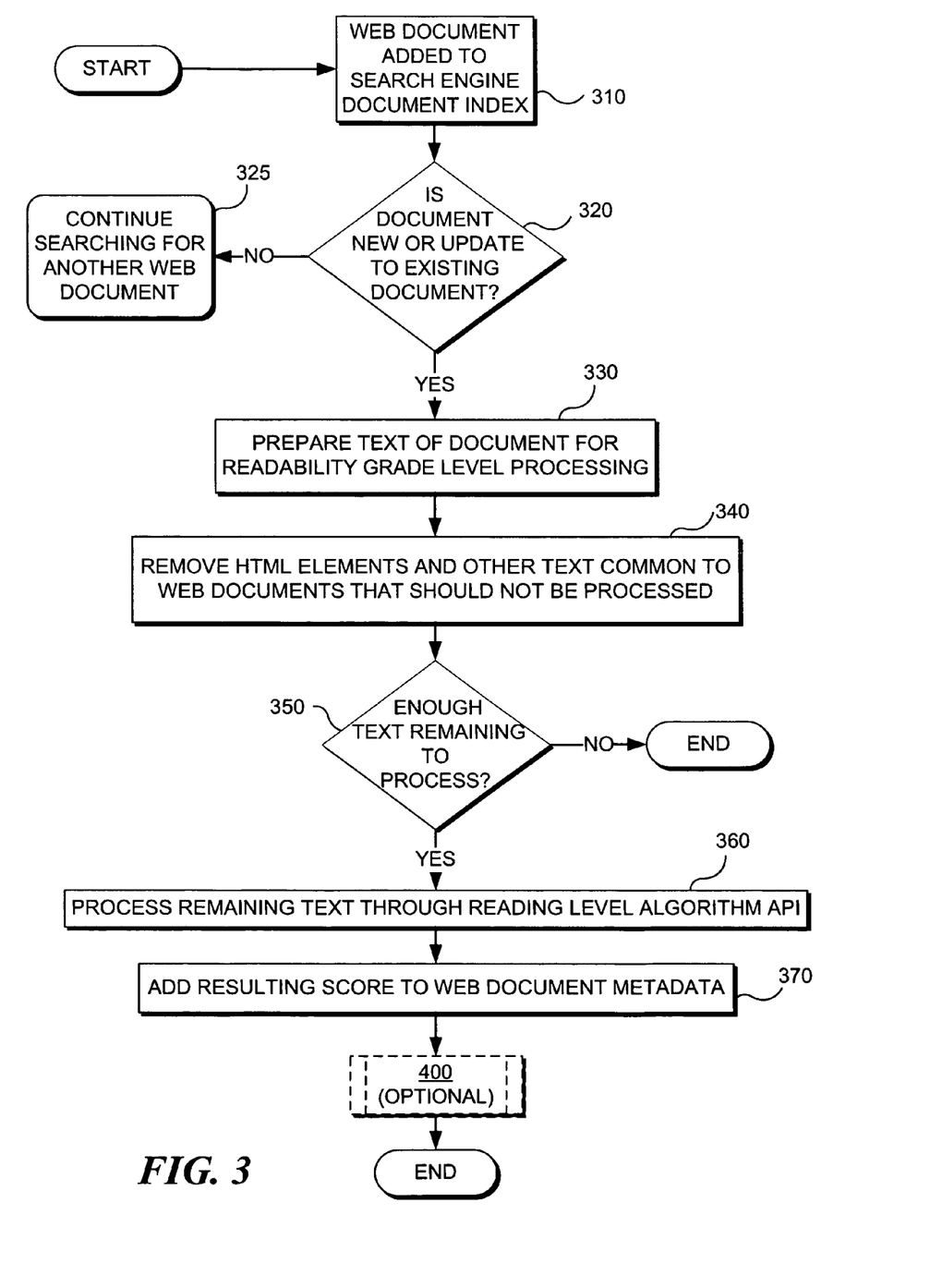
FIG. 3 is a flow diagram illustrating an exemplary method for generating a search index that is searchable by grade level identifiers associated with data included in the search index.

Exemplary Method for Generating a Search Index that Includes Grade Level Identifiers Indicating Readability FIG. 3 is an exemplary flow diagram 300 illustrating an exemplary method for generating a search index that is searchable by grade level identifiers associated with each document or similar entity included in the search index. This method can be implemented in some embodiments with components, devices, and techniques as discussed with reference to FIGS. 1-2. In some implementations, one or more steps of the method embodied in exemplary flowchart 300 are carried out when machine executable instructions stored on a computer readable medium are executed on a computing device, such as by a processing unit 21 in PC 20 (FIG. 1). In the following description, various steps of the exemplary method shown in flowchart 300 are described with respect to one or more processors performing the steps. In some implementations, certain steps of the method can be combined, and performed simultaneously or in a different order, without deviating from the objective of the method or without producing different results. The exemplary method of flowchart 300 begins at a step 310. It should be noted that the method illustrated in flow diagram 300 is generally carried out as a back-office function; that is, the method is not invoked as a run-time operation in conjunction with a search inquiry, but rather operates as a background operation independent of any user initiated search activity.

In step 310, a document that is accessible in the environment in which search indexing is proceeding is identified for addition to the search index. Typically, this environment will be the entire Internet, but may be limited to a LAN, a WAN, or even a single storage (e.g., on the hard drive or other storage of the computing device that will be doing searches). Also, as noted below, the search may be further restricted. The document can be identified at any time after an agent used to identify documents is enabled. In one example, a Web crawling agent can identify documents on a perpetual or continuing periodic basis, for as long as the agent is running. In one implementation, identifying a document includes applying an agent algorithm within a predefined domain to automatically locate at least one sub-domain of the predefined domain and then retrieve a document from the sub-domain. One example of this implementation further includes applying the agent algorithm to map and retrieve each additional retrievable document referenced within the sub-domain. When a document is retrieved, one embodiment provides for caching or storing at least a portion of the document; however, it is also contemplated that an address path to the document, or a pointer may be included in the search index rather than at least a portion of the document. In another implementation, a document can be identified in an existing search index within the environment in which search indexing is proceeding. In this implementation, the identified document is typically a document which is not associated with a grade level identifier.

In a step 320, it is determined if the identified document is associated with a preexisting entry in the search index. The determination can be made at any time after the document is identified. In one implementation, a determination is made that a pre-existing entry in the search index has already been provided for the identified document, and in a step 325, the method continues searching for another document (or carries out any other normal processing not directly related to with this method). In one implementation, the method would identify another document and return to step 310 of the method. If no other document remains to be processed, the method will terminate until the next time it is to search for a document to be added or modified in the search index. In another implementation, determining if the identified document is associated with a preexisting entry in the search index includes determining whether the identified document has a prior established association with a grade level identifier.

If it is determined that the identified document is not associated with a preexisting entry in the search index, the method continues to a step 330, where a process of analyzing the readability of the identified document to produce a grade level identifier based on predetermined readability score criteria is initiated. In a step 330, the identified document is prepared for a readability analysis. In one implementation, in a step 340 HTML elements and other text common to Web documents which should not be processed are stripped from the identified document. In this implementation, in a step 350 it is then determined whether enough text remains in the identified document for readability analysis. If it is determined that there is not enough text remaining in the identified document for processing, method terminates. If however, enough text remains for processing, then in a step 360 a readability algorithm is applied to the remaining text. In one implementation, the readability algorithm is invoked through a reading level algorithm API. Once the identified document text is processed by the readability algorithm a new entry is generated in the search index for the identified document. In one implementation, as illustrated in a step 370, a grade level identifier (i.e., a readability indicator) is added to the document after processing the document with the readability algorithm. The new entry includes the grade level or other readability identifier, thereby enabling that document to be identified in the search result if it meets the grade level for the search request. In one implementation, a metadata grade level indicator is produced based on the readability score corresponding to predetermined grade level guidelines. The method then proceeds to an optional method shown in a flowchart 400, as illustrated in FIG. 4, or terminates.

In an alternate implementation, it is determined at step 320 whether the identified document is an updated version of a preexisting entry. In this implementation, when the document is found to be an updated version of a preexisting entry in the search index, the readability of the document is preferably again analyzed to produce a grade level identifier and a replacement entry is generated that includes the grade level (or other readability) identifier, which is stored in the search index, thereby replacing the existing entry for the document—which actually may be unchanged.

Figure 4:
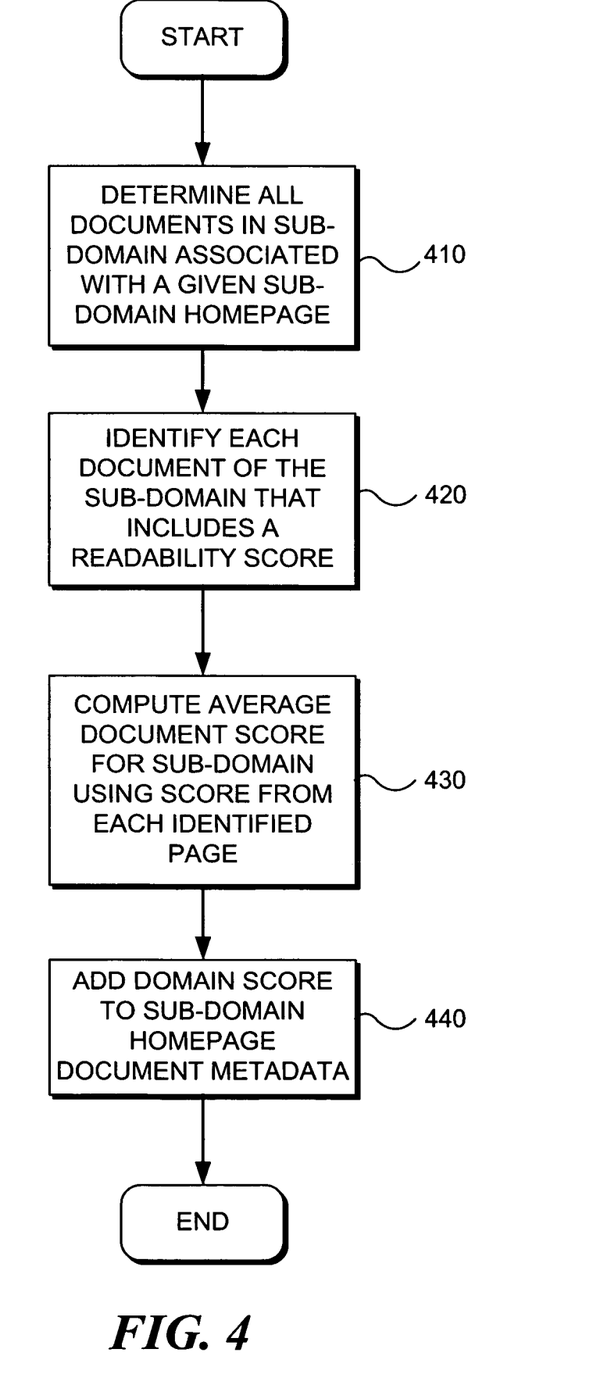
FIG. 4 is a flow diagram illustrating the steps of another exemplary method for generating a search index that is searchable by grade level identifiers.

As discussed above, an optional method carried out in flowchart 400 is illustrated in FIG. 4. As with the method shown in flowchart 300, the method in flowchart 400 can be implemented in with components, devices, and techniques, as discussed with reference to FIGS. 1-2. In some implementations, one or more steps of the method can be carried out when machine executable instructions stored on a computer readable medium are executed on a computing device, such as processing unit 21 of PC 20 (FIG. 1). In the following description, various steps of the method are described with respect to one or more processors performing the method steps. In some implementations, certain steps of the method can be combined, and performed simultaneously or in a different order, without deviating from the objective of the method or without producing different results. The method begins at a step 410.

In one implementation, as illustrated in step 410, at least one entry in the search index is identified that is associated with a specific sub-domain. The entry can be identified at any time, and step 410 can operate independently of the technique that is being explained herein. In a step 420, each existing grade level identifier (or other readability indicator) for each identified entry (i.e., for each document or similar entity) associated with the specific sub-domain is identified. In a step 430, an average readability score can then be produced for the specific sub-domain, based on the grade level indicators for each entry associated with the specific domain. In a step 440, the average readability score can then be added to at least one entry associated with the specific sub-domain. For example, in one implementation, the average readability score is added to a document of the sub-domain, such as a homepage of a website, as metadata that describes the average readability for one or more documents within the sub-domain associated with that homepage.

The metadata for a domain or a sub-domain can be employed when searching the search index to return results based upon a grade level in the following manner. If the user stipulates that the results should include only documents having a readability no higher than the $10^{th}$ grade, it may be helpful to return results that indicate a sub-domain (e.g., for a magazine Web site that includes subject matter related to the other search criteria) that meets that grade level requirement only because its average grade level for readability is at or below the $10^{th}$ grade, even though the Web site includes documents having a higher readability level. The user can then assess whether to explore the magazine web site to look for articles that might be only slightly higher in grade level than the $10^{th}$ grade, but particularly relevant to the desired results for the search. A search engine can then be configured to first list any relevant results for documents tagged with an average readability score, and next list documents tagged with readability data for the individual documents. Many other applications for the document metadata provided by the steps of flowchart 400 will be apparent to those of ordinary skill in the art, in relation to the searches limited by a readability indicator.

Figure 5:
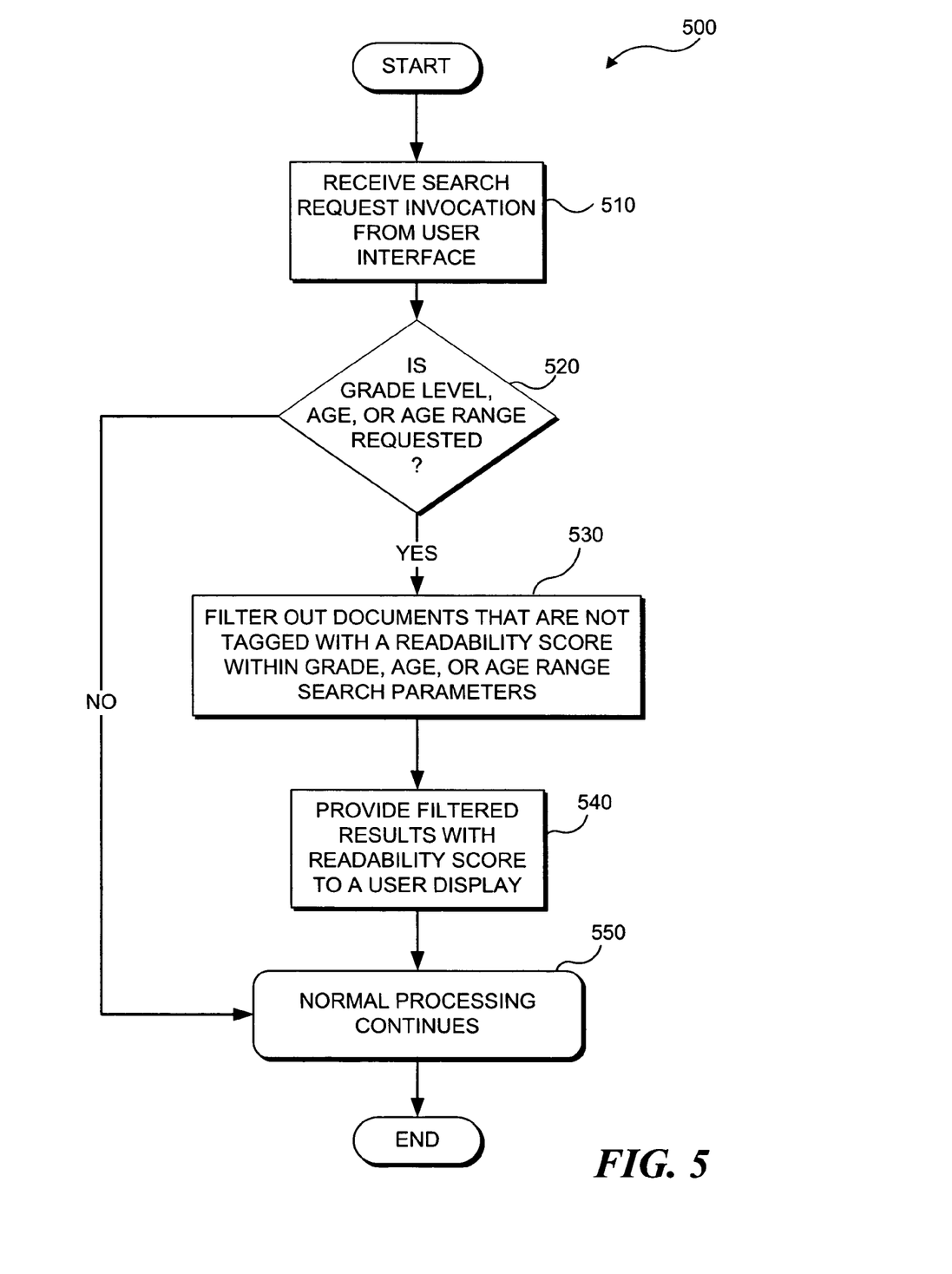
FIG. 5 is a flow diagram illustrating an exemplary method 500 for providing results for a search query, where the results are limited to a desired readability or grade level.

FIG. 5 is a flowchart 500 illustrating an exemplary method for enabling a search query based on grade level. The method can be implemented in some embodiments with components, devices and techniques as discussed with reference to FIGS. 1-4. In some implementations, one or more steps of the method are carried out when machine executable instructions stored on a computer readable medium are executed on a computing device, such as processing unit 21 of PC 20 (FIG. 1). In the following description, various steps of the method are described with respect to one or more console service processors performing the method steps. In some implementations, certain steps of the method can be combined, and performed simultaneously or in a different order, without deviating from the objective of the method or without producing different results. The method begins at a step 510.

In step 510, a search request is received for a document search from a user device. In one implementation, a request can be an invocation from a user interface, e.g., from within a user interface of a Web browser program. The search request can be received at any time that a search provider system is functional to receive the request. A request may be received from any user device capable of generating a recognizable request and invoking a search based on the request. In a step 520, it is next determined if the search request includes a grade level (or other readability) indicator for restricting the search results to a specific grade, age, or age range. In operation, a grade level indicator corresponds to grade level (or other readability) metadata attached to documents in the search index that is used by the search provider. If it is determined that no specific grade level, age, or age range indicator is included in the search request, normal processing continues in a step 550, i.e., the search results are determined without consideration of their readability.

In one implementation, when normal processing continues, the method relating to the present technique effectively terminates. However, it is also contemplated that control might simply be returned to step 510 of the method, to await any change in the search request or entry of a new search request that might indicate the results be filtered for readability.

When it is determined that the search request includes the grade level, age, or age range indicator, the search request is submitted to carry out a search of the search index. The search index includes a plurality of document entries and with each document entry incorporating metadata that includes a grade level (or other readability) indicator based on a pre-evaluated readability score. In one implementation, as indicated in a step 530, documents that are not tagged with the readability score within the grade level search parameters are filtered, and therefore not return a search results. In a step 540, the filtered results can be provided to a user display for viewing by the person making the search request. In one implementation, each search result is displayed with a readability score corresponding to the readability score result generated by a readability algorithm. In another implementation, each search result is displayed with a grade level score that corresponds to a predetermined school grade level appropriate for the aggregate readability score generated by the readability algorithm. The search result that is displayed can also indicate an age or age range indicative of the readability of each document in the result.

It should clearly be understood that a search request can filter out either material that has a readability score above a grade or age level, or can material that has readability below a grade or age level. Thus, for example, a graduate student might choose to search only for material have a readability above that of a $9^{th}$ grade level or higher. Also, material having a readability that is both below a first grade level and above a second grade level (that is substantially higher than the first grade level) can be filtered out using this approach.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A computer-implemented method for enabling a search query based on readability of results that may be returned in response to the search query, comprising the steps of:
    (a) receiving an initial search request for a document search from a user device;
    (b) determining that the initial search request includes: (i) one or more words as a basis of a search for documents; and (ii) a grade level indicator for restricting search result to a specific readability level;
    (c) submitting the search request for searching a search index, wherein the search index includes a plurality of document entries having an associated grade level indicator based on a pre-evaluated readability score, and wherein a plurality of the document entries are each associated with a domain having an entry for a homepage of the domain, the entry for the homepage of the domain also including an average grade level indicator, the average grade level indicator being an average of pre-evaluated grade level indicators of all different document entries associated with the domain;
    (d) generating a search result list from the submitted search request, the search result list being based on a search for search index document entries that match the search request and the grade level indicator;
    (e) ordering search results in the search result list into an ordered search result list, wherein ordering the search results includes listing any relevant domains having a matching average grade level indicator and only thereafter listing individual documents having a matching grade level indicator; and
    (e) displaying the ordered search result list to the user at a user interface such that all domains with a matching average grade level indicator are displayed prior to individual documents having a matching grade level indicator.

2. The method of claim 1, further comprising the step of selecting an age range filter based on the grade level indicator, the age range filter being applied to determine the results returned to the user device.

3. The method of claim 2, wherein the generated search result list is based on a search for search index document entries that match the search request and the age range filter that was selected.

4. The method of claim 1, wherein the search request includes a plurality of different grade level indicators, wherein each different grade level indicator is associated with a different readability score.

5. A system for producing a search index including a plurality of entries that are searchable by a readability indication for the entries, the system comprising:
    a search index database in which are stored the plurality of entries comprising the search index;
    a server computer in communication with the search index database, the server computer including a processor, and a memory in communication with the processor, the memory storing data and machine instructions that when executed by the processor, cause the processor to carry out a computer-implemented method for enabling a search query based on readability of results that may be returned in response to the search query, comprising the steps of:

(a) receiving an initial search request for a document search from a user device;

(b) determining that the initial search request includes: (i) one or more words as a basis of a search for documents: and (ii) a grade level indicator for restricting search result to a specific readability level;

(c) submitting the search request for searching a search index, wherein the search index includes a plurality of document entries includes having an associated grade level indicator based on a pre-evaluated readability score, and wherein a plurality of the document entries are each associated with a domain having an entry for a homepage of the domain, the entry for the homepage of the domain also including an average grade level indicator, the average grade level indicator being an average of pre-evaluated grade level indicators of all different document entries associated with the domain;

(d) generating a search result list from the submitted search request, the search result list being based on a search for search index document entries that match the search request and the grade level indicator;

(e) ordering search results in the search result list into an ordered search result list, wherein ordering the search results includes listing any relevant domains having a matching average, grade level indicator and only thereafter listing individual documents having a matching grade level indicator: and (e) displaying the ordered search result list to the user at a user interface such that all domains with a matching average grade level indicator are displayed prior to individual documents having a matching grade level indicator.

* * * * *